(No Model.)
P. LANGE.
VOLTMETER.
No. 383,649.  Patented May 29, 1888.
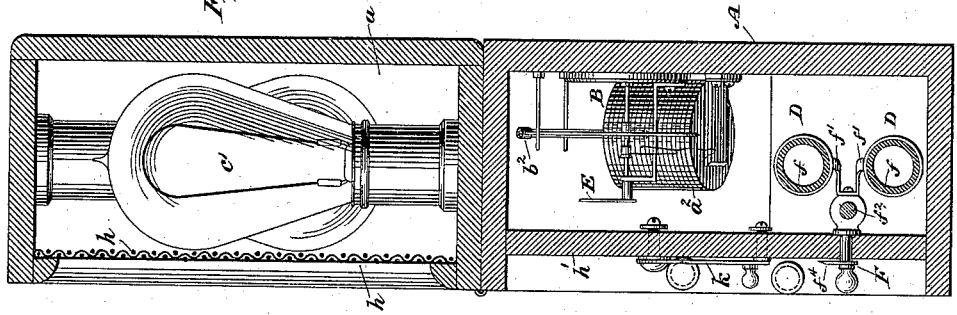
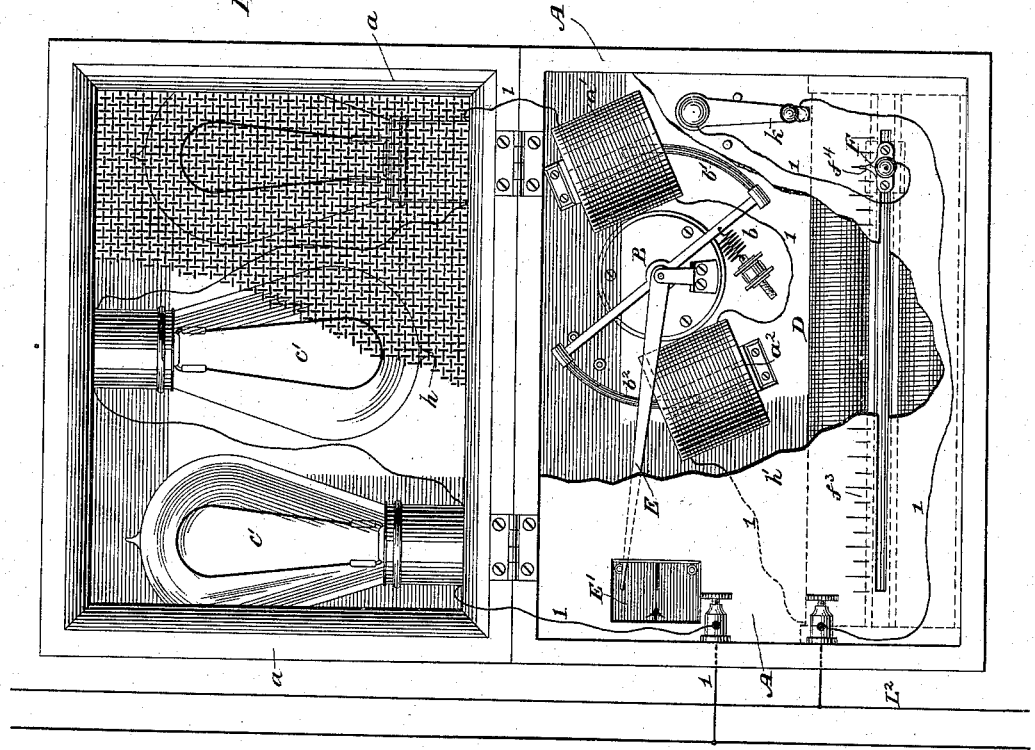
Witnesses
Geo. W. Breck.
Edward Thorpe.
Inventor,
Philip Lange
By his Attorneys
Pope Edgecomb & Terry.

UNITED STATES PATENT OFFICE.

PHILIP LANGE, OF PITTSBURG, PENNSYLVANIA, ASSIGNOR TO THE WESTINGHOUSE ELECTRIC COMPANY, OF SAME PLACE.

VOLTMETER.

SPECIFICATION forming part of Letters Patent No. 383,649, dated May 29, 1888.

Application filed October 29, 1887. Serial No. 253,721. (No model.)

*To all whom it may concern:*

Be it known that I, PHILIP LANGE, a citizen of the United States, residing at Pittsburg, in the county of Allegheny and State of Pennsylvania, have invented certain new and useful Improvements in Voltmeters, of which the following is a specification.

The invention relates to the class of devices employed for measuring electric currents; and the object of the invention is to provide a convenient portable electric voltmeter which is especially adapted for use in connection with alternating electric currents. It is, however, applicable to circuits supplied by direct currents.

The invention involves certain details of construction of the various parts of the device and their arrangement, and it will be described in connection with the accompanying drawings, in which—

Figure 1 is a plan of the apparatus as contained in a box shown as open, and Fig. 2 is a transverse section of the same.

Referring to the figures, A represents a suitable box provided with a cover, $a$, in which the device is contained. The meter is shown as connected in a conductor, $l$, connected across the conductors $L'$ and $L^2$ of an electric circuit. This conductor includes two magnetizing-coils, $a'$ and $a^2$, and a resistance—such, for instance, as incandescent electric lamps $c'$ $c'$. An adjustable metallic resistance, D, may also be included in the circuit. The coils or solenoids $a'$ and $a^2$ act upon cores $b'$ and $b^2$, respectively. These cores are mounted upon the respective ends of a pivoted bar, B, and they are so curved that they may be drawn a greater or less distance into their respective coils. The cores are preferably made up of fine wires magnetically separated from each other, and they are normally held out from the coils by means of a spring, $b$, the tension of which is adjustable. An indicator, E, is secured to the arbor of the support B, and this moves over an indicating-plate, E', so that the current passing through the coils may be determined.

The resistance D is adjustable by means of a sliding contact device, F, through which the connections are completed. This resistance preferably consists of fine wire wound upon spools $ff$, of insulating material. The slide F carries contact-arms $f'$ $f'$, which may be moved toward or from the ends of the resistance-coils.

The resistance-lamps $c'$ $c'$ serve to reduce the current traversing the conductor $l$ to such proportions as to render the error due to heat variations in the coils insignificant, for the proportion of energy which is expended in the coils is so small that the change in their resistance by reason of the heat may be neglected.

For the purpose of protecting the lamps $c'$ they are preferably covered by a wire-gauze, as shown at $h$, and they are placed in the cover or lid of the box. The coils $a'$ $a^2$ and their cores are protected by a covering, $h'$, which also affords a support for the scale $f^3$, applied to the indicator $f^4$ upon the slide F, which moves along the rod $f^2$. An opening is formed in the covering $h'$ above the plate E', so that the pointer E may be visible.

A switch, $k$, is inserted in the conductor $l$, through which the connections of the conductor may be made and interrupted at will.

I claim as my invention—

1. The combination, with a voltmeter consisting of two coils or solenoids, their respective cores, a common support for said cores, an indicator moved by said support, and metallic and carbon resistances in circuit with said coils, of a box containing the same, consisting of two parts hinged together, one part carrying the carbon resistance and the other the coils and metallic resistance, substantially as described.

2. The combination of a case, A, having a cover or lid, A', the incandescent electric lamps placed in the lid and shielded by the covering of wire-gauze, the indicating apparatus placed in the case A, an adjustable resistance, D, the protecting-cover for the coils and resistance, an indicator and adjustable slide for the resistance, said indicator projecting above said protecting-cover, and an indicating-arm visible through the cover, substantially as described.

3. In an indicator for electric circuits, carbon resistances consisting of incandescent electric lamps, a box containing the indicator and said lamps, and a wire-gauze or ventilating protecting-cover for said lamps.

In testimony whereof I have hereunto subscribed my name this 18th day of October, A. D. 1887.

PHILIP LANGE.

Witnesses:
W. D. UPTEGRAFF,
DANL. W. EDGECOMB.